US005507044A

United States Patent [19]

[11] Patent Number: 5,507,044

[45] Date of Patent: Apr. 16, 1996

Williamson et al.

[54] TURN STAND

[76] Inventors: Lester H. Williamson; Marsha K. Williamson, both of R.D. #1, Box 97-C, Templeton, Pa. 16259

[21] Appl. No.: 389,207

[22] Filed: Feb. 15, 1995

[51] Int. Cl.[6] .................................................. A61C 7/10

[52] U.S. Cl. .................................. 5/81.1; 5/507.1; 5/602

[58] Field of Search .................................. 5/81.1, 503.1, 5/507.1, 658, 602

[56] References Cited

U.S. PATENT DOCUMENTS

| | | | |
|---|---|---|---|
| 2,757,388 | 8/1956 | Chisholm | 5/507.1 |
| 2,975,435 | 3/1961 | Forrest | 5/507.1 |
| 3,911,509 | 10/1975 | Fleckenstein | 5/507.1 |
| 4,279,093 | 7/1981 | Saunders | 5/81.1 |
| 4,934,003 | 6/1990 | Hayakawa et al. | 5/81.1 |
| 5,054,137 | 10/1991 | Christensen | 5/81.1 |
| 5,079,789 | 1/1992 | Jandrakovic | 5/81.1 |
| 5,311,622 | 5/1994 | Allen | 5/81.1 |

*Primary Examiner*—Michael F. Trettel
*Attorney, Agent, or Firm*—George C. Atwell

[57] ABSTRACT

A turn stand is disclosed for moving an individual who has physical impairments but can support himself in a standing position for a short time. The turn stand is utilized for moving the individual from one location to an adjacent location, for example, from a bed to a wheelchair, and comprises a base member disposed on a floor surface and a platform secured superjacent to the base member which is capable of selective rotation with respect to the base member and upon which the individual stands. A ball bearing swivel is attached to the base member and is also secured subjacent to the platform for permitting selective rotation of the platform relative to the base member. An upright pole is attached to the platform and terminates at a pair of handles which can be gripped by the individual so that the individual can support himself on the platform during the transfer or movement from one location to another. A brake assembly is disposed within the pole and includes a brake mechanism which selectively engages or disengages the base member when the individual, or an assisting person, manually pushes down on either of a pair of brake handles pivotally mounted at the upper end of the pole. The turn stand can also include a mechanical driving unit to selectively rotate the platform and a load cell to register the individual's weight while standing upon the platform.

23 Claims, 4 Drawing Sheets

TURN STAND

BACKGROUND OF THE INVENTION

The present invention relates to medical devices for assisting physically impaired and handicapped individuals, and more particularly pertains to an assist device or turn stand which facilitates movement of the individual from one location to an adjacent location, for example, from a bed to a wheelchair or from a wheelchair to a commode.

The medical technology industry has produced a wide range of devices to facilitate movement and ambulation of physically impaired and handicapped individuals. Among the devices conceived by the medical technology industry and in widespread use are motorized wheelchairs, walkers, motorized carts, and prostheses for the arm, hand, foot, and leg. In addition, various types of transfer stands have been employed to transfer the individual from one location or position to an adjacent location or position. The transfer stands currently being used are not designed to move the individual across a distance which may be from a kitchen through a living room and to a bedroom. Instead, the only purpose of any transfer stand is to facilitate the transfer of the individual from one position or location to an adjacent position or location.

Furthermore, the transfer stand can only be used for individuals who, despite their physical impairments, are able to support themselves in an upright position with their arms on the transfer stand. Because the individual will only be positioned on the transfer stand for a brief time, it is not necessary that the individual possess the arm strength of a healthy, able-bodied person. The individual need only possess a minimal amount of arm strength for briefly maintaining himself or herself in a generally upright position on the transfer stand. In addition, it is necessary that the individual being transferred from one location to another by the transfer stand be attended and partly assisted by another person such as a hospital orderly, a visiting nurse, or a resident of the household. The individual for whom the turn stand is designed generally will not be able to move by himself from a bed to an adjacently positioned transfer stand and will not be able to get off a commode and position himself upon an adjacent transfer stand by his own physical exertions, so another person will be required for assistance in moving, lifting, standing, and sitting the individual.

The prior art discloses a number of transfer stands for accomplishing the above-described goal of moving a physically impaired individual from one location to another. For example, U.S. Pat. No. 2,757,388 discloses a rotatable transfer stand which employs a treadle means to lock the platform after the platform has been rotated. U.S. Pat. No. 2,975,435 discloses an invalid transfer apparatus which employs a hydraulic system to lift and transfer an invalid from one location to another. U.S. Pat. No. 3,911,509 discloses a patient transfer stand which includes retractable casters for rolling the stand on the floor. U.S. Pat. No. 4,279,043 discloses a transfer stand which includes support structure which supports the individual on the stand. U.S. Pat. No. 4,934,003 discloses a device for transferring the disabled which includes a selectively tiltable saddle, and U.S. Pat. No. 5,054,137 discloses an apparatus for maneuvering a physically impaired individual which includes a lock mechanism for stopping rotation of the platform.

Despite the ingenuity of the foregoing devices, there remains a need for a transfer device or stand which is sturdy, durable, easy to manually engage and disengage for rotation when the individual is disposed thereupon, and can accommodate individuals of varying heights and having various arm lengths.

SUMMARY OF THE INVENTION

The present invention comprehends a turn stand for transferring a physically impaired or handicapped individual from one location or position to an adjacent location or position, such as, for example, from a bed to a wheelchair or from a wheelchair to a toilet seat. Although the individual for which the turn stand of the present invention is designed may be physically handicapped, physically impaired, or may be infirm and convalescing from an illness or surgery, the individual must be able to use his or her arms to briefly support himself or herself on the turn stand while being transferred from one location to another location.

The turn stand of the present invention comprehends a flat base member which is disposed on a level surface and can be manually pulled or moved thereon. A platform is secured superjacent to the base member and is spaced slightly from the base member. The individual stands upon the platform while being transferred from one location to another. A rotation means is disposed between the base member and the platform for permitting selective rotation of the platform with respect to the base member to transfer the individual. Furthermore, the rotation means comprises a ball bearing swivel which is located between and secured to both the base member and the platform.

Secured to the platform, and extending upwardly therefrom, is an upright pole. In addition, a cylindrical sleeve is secured to the platform and projects upwardly from the platform for receiving the lower pole end of the pole so that the pole can be inserted into the sleeve and removed therefrom as desired.

A pair of handles are attached to the upper pole end of the pole and can be gripped by the individual for supporting the individual on the platform during the process of transferring the individual from one location to an adjacent location. The turn stand also includes a pair of wheels attached to the platform adjacent either side of the pole. The wheels are not utilized to transfer the individual from one location to another but are employed to roll the turn stand from one room to another or from a room to a storage closet.

Disposed within the pole is a manually operable brake means which selectively engages the flat base member to prevent or halt rotation of the platform and which can be selectively disengaged from the base member to permit rotation on the platform to transfer the individual from one location to another. The brake means includes an elongated brake rod disposed within and extending the length of the pole and which is capable of selective linear reciprocable movement within the pole. The brake rod has an upper rod end and a lower rod end, and secured to the lower rod end is a brake mechanism or member, such as a rubber brake, which is in contact with the base member when the brake means is engaged and is lifted off the base member when the brake means is disengaged. The brake means also includes a brake cap disposed within the pole at the upper pole end and to which the brake rod is attached by a brake release rod. Pivotally secured to the brake cap are a pair of manually-operable brake handles. Manually pushing up or down on either brake handle pulls the brake rod upward within the pole and thus causes the rubber brake to disengage from contact with the base member, thus permitting the rotation of the platform.

The turn stand of the present invention can also be provided with a mechanical drive system for selectively rotating the platform to transfer the individual. The mechanical drive system includes a circular tracking wheel, secured to the base member and encircling the ball bearing swivel. A drive motor is mounted to the platform adjacent the pole and drives a drive wheel disposed between the base member and the platform and which is in contact with the tracking wheel. When the drive motor is started, the drive wheel rotates and frictionally engages the stationary tracking wheel and, in effect, walks along the tracking wheel thus causing the platform to rotate. Moreover, the turn stand can also include a load cell disposed within or below the platform for registering the individual's weight while the individual is standing on the platform.

It is an object of the present invention to provide a turn stand that is sturdy, durable and able to easily support and transfer individuals of varying heights and weights.

It is another object of the present invention to provide a turn stand which can include either a manual rotation means or a mechanical rotation means.

It is a further objective of the present invention to provide a turn stand which includes a load cell for registering the weight of the individual while standing upon the platform.

Other features, advantages, and objects of the present invention will become apparent with reference to the following description and accompanying drawings.

DETAILED DESCRIPTION OF THE PREFERRED EMBODIMENT

Figure 7:
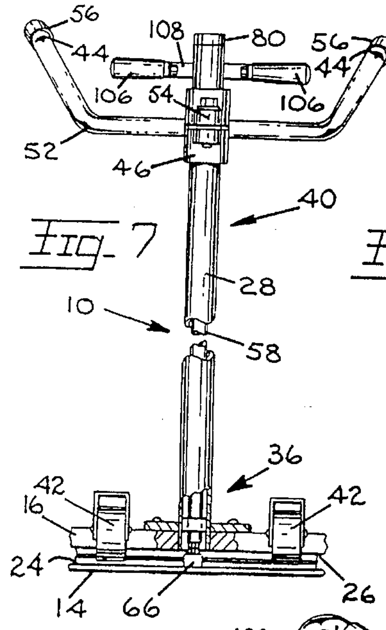
FIG. 7 is a front elevational view of the turn stand first shown in FIG. 1 illustrating the engagement of the brake member against the base member.

Illustrated in FIGS. 1–12 is an assist device or turn stand 10 for transferring a physically impaired or handicapped individual 12 from one location or position to an adjacent location or position. The individual for which the turn stand 10 is designed must be able to support himself or herself with his or her arms in an upright and generally standing position for a brief time period which is usually no longer than the several minutes required for the transfer of the individual to take place. It should be noted at the outset that the turn stand 10 of the present invention is not designed to transport the individual from one room to another room such as, for example, from a living room to a dining room or from a dining room to a bedroom. The turn stand 10 is instead designed for transferring an individual from one location to an adjacent location, such as from a toilet to an adjacently positioned wheelchair or from a wheelchair to an immediately adjacent bed. In addition, use of the turn stand 10 requires a physically able and healthy individual to assist the infirm or handicapped individual in being positioned on the turn stand 10 and transferred therefrom. The assisting individual can be a hospital orderly, a visiting nurse, a family member, or any other competent resident of the household.

Illustrated in FIGS. 1–10 is the preferred embodiment of the turn stand 10 of the present invention. The turn stand 10 includes a square-shaped, flat base member 14 which is disposed on a level or floor surface, such as a floor of a house, and is capable of being manually moved thereon. A flat, square-shaped standing platform 16 is secured superjacent to and spaced slightly from the base member 14. The base member 14 and the platform 16 have roughly the same length and width dimensions and the platform 16 is capable of rotation in a 360° circle while the base member 14 remains stationary upon the floor. The individual 12 stands upon the platform 16 and the rotation of the platform 16 permits transference of the individual 12 from one location or position to another location or position.

As illustrated in FIGS. 1, 2, 10, and 11, a rotation means is utilized to permit rotation of the platform 16 relative to the base member 14 which is stationary upon the floor during transfer of the individual 12. The rotation means is disposed between and connects the base member 14 to the platform 16 and permits selective rotation of the platform 16 during the transfer process. The rotation means includes a ball bearing swivel structure 18 which comprises a stationary bearing plate 20 and a rotatable ball bearing plate 22. The bearing plate 20 is secured to an upper surface 24 of the base member 14 and the ball bearing plate 22 is secured to a lower platform surface 26 of the platform 16. Sandwiched between the bearing plate 20 and the ball bearing plate 22 is a ball bearing assembly (not shown) which is of conventional design and manufacture. The ball bearing assembly of the present invention comprises six 5/16-inch ball bearing swivels secured to the upper surface 24 and which is enclosed between the bearing plate 20 and the ball bearing plate 22. The ball bearing assembly also includes two nylon slides which help support the weight of the individual pressing down on the plates 20 and 22 when the individual is standing upon the platform 16.

Shown in FIGS. 1–13 is an upright pole 28 which is secured to the platform 16 and extends upwardly therefrom. A pole support plate 30 and a gusset plate 32 help support the pole 28 in its upright disposition. Furthermore, a cylindrical sleeve 34 is secured to the support plate 30 and extends upwardly therefrom for allowing removable securement of the pole 28 to the platform 16. The pole 28 is inserted into a cylindrical sleeve 34 at a lower pole end 36 and a button release 38 on the sleeve 34 allows the detachment of the pole 28 from the sleeve 34. The pole 28 is approximately three feet in length and terminates at an upper pole end 40.

Figure 2:
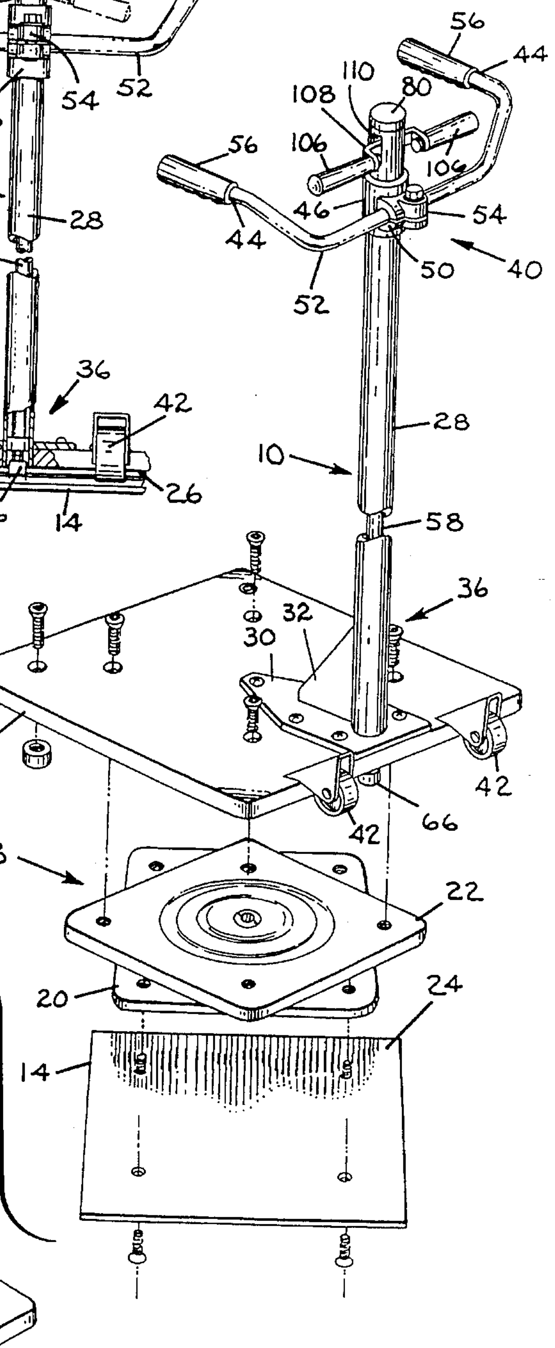
FIG. 2 is an exploded isometric view of the turn stand first shown in FIG. 1.
Figure 1:
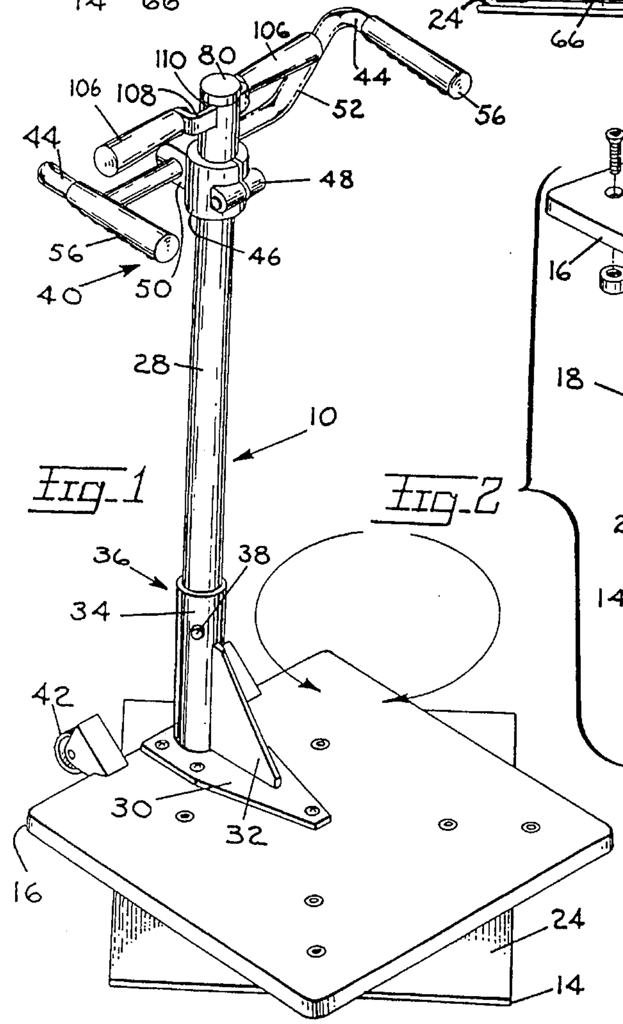
FIG. 1 is an isometric view of the preferred embodiment of the turn stand of the present invention.

As shown in FIGS. 1 and 2, the turn stand 10 includes a pair of spaced-apart castors or wheels 42 mounted to the leading front edge of the platform 16 and which are utilized to move the turn stand 10 from one location to another. In order to do this, the turn stand 10 is tilted by the assisting person so that one edge of the base member 14 is tilted at an angle off the floor and then the turn stand 10 can be rolled across the floor by the assisting person. The turn stand 10 should never be moved in this manner with the individual standing upon the platform 16. For example, if the turn stand 10 is located in the kitchen and if the individual is seated in his wheelchair adjacent the commode in the bathroom and is awaiting transfer from the wheelchair to the commode, the assisting person could transport the turn stand 10 to the bathroom by tipping it on its wheels 42 and rolling it to the bathroom.

As shown in FIGS. 1, 2, and 6–9, a pair of handles 44 are provided for assisting the individual in standing in an upright posture upon the platform 16 during the transfer process. The handles 44 are removably attachable at the upper end 40 of the pole 28. Because individuals using the transfer stand 10 will be of varying heights, a handle adjustment means is provided with the turn stand 10 of the present invention. The handle adjustment means comprises a cylindrical adjustment collar 46 which fits around the pole 28. The adjustment collar 46 includes a nut and bolt assembly portion 48. By tightening this assembly 48, the collar 46 is secured and tightened to the pole 28 at a fixed position; on the other hand, loosening the assembly 48 causes a slight loosening of the collar 46 with respect to the pole 28 and thus allows the collar 46 to be slidably moved upward or downward along the pole 28 for proper positioning according to the height and reach of the individual. The collar 46 also includes a handle receiving portion 50 through which the central portion of a handle bar 52 is inserted for attaching the bar 52 to the collar 46. The bar 52 is then firmly secured to the collar 46 by tightening down a second nut and bolt assembly 54. Thus, when the collar 46 is slidably moved up or down along the pole 28, the bar 52 and the handles 44 move with the collar 46 as one unit. In addition, each handle also includes a non-slip, textured rubber grip 56 for permitting more secure gripping of each handle 44 by the individual being transferred.

Figure 3:
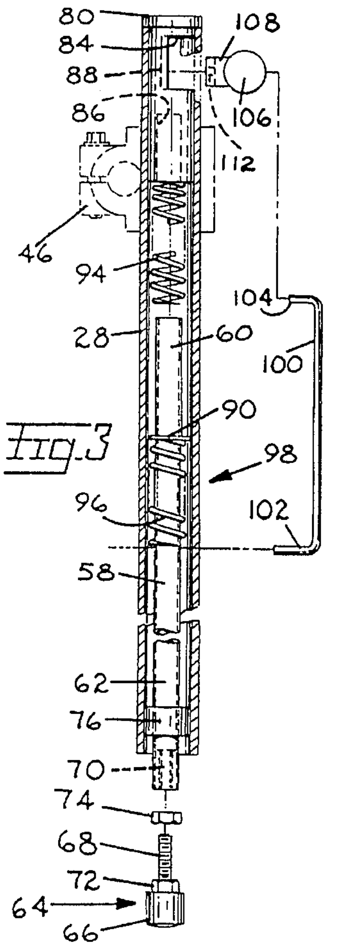
FIG. 3 is a side elevational view of structural components disposed within the upright turn stand first shown in FIG. 1.
Figure 4:
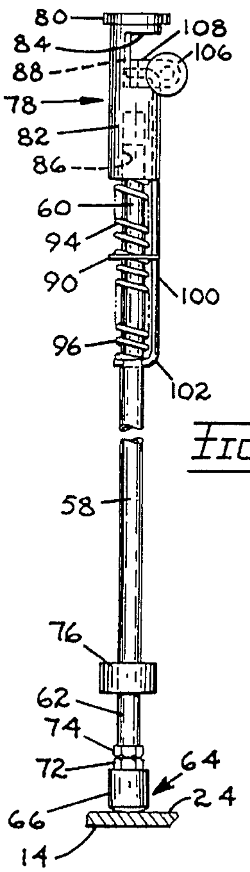
FIG. 4 is a side elevational view of structural components disposed within the upright pole first shown in FIG. 3.
Figure 5:
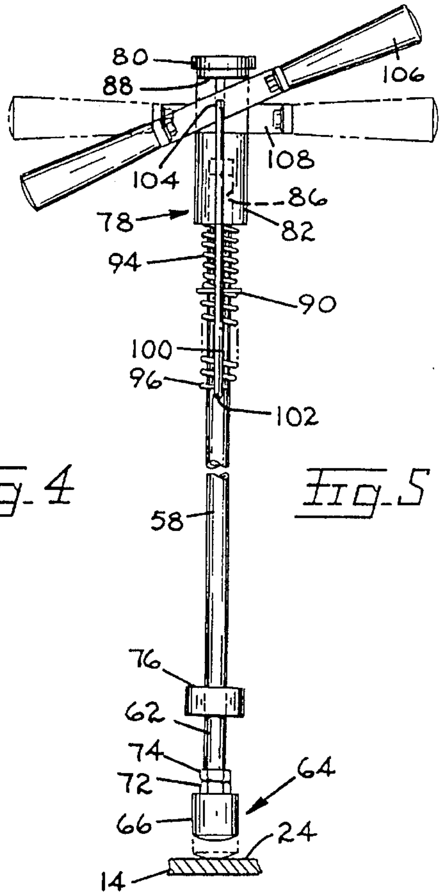
FIG. 5 is a front elevational view of structural components disposed within the upright pole of the turn stand first shown in FIG. 3.

As shown in FIGS. 2–5, a manually operable brake means is utilized to permit the selective rotation of the platform 16 so that the transfer of the individual can take place. The manually operable brake means can selectively engage or disengage the base member 14 to prevent or allow rotation of the platform 16. As illustrated in FIGS. 3–5, the primary structural components of the brake means are disposed within the pole 28. The brake means includes an elongated brake rod 58 which has an upper rod end 60 and a lower rod end 62, the rod 58 being completely enclosed within the pole 28, and as will be more fully explained hereinafter, the rod 58 is capable of selective linear reciprocal movement within the pole 28 upward toward the pole end 40, or, conversely, downward toward the base member 14. Secured to the rod end 62 is a brake member 64 which is removably attachable at the rod end 62. The brake member 64 terminates with a rubber brake 66 which includes an infixed threaded bolt 68. The bolt 68 is threadably inserted into a threaded blind hole 70 at the rod end 62. In order to attach the brake 66 to the blind hole 70, a jam nut 72 is first threaded onto the bolt 68 and a hex nut 74 is welded to the tip of rod end 62 in axial alignment with the blind hole 70. A nylon guide bushing 76 having a central aperture (not shown) is then slipped onto the rod end 62. The bushing 76 slides against the inside cylindrical surface of the pole 28 and prevents the angular displacement of the rod end 62 when the rod 58 moves linearly within the pole 28 during engagement or disengagement of the brake 66 with the surface 24 of the base member 14.

Illustrated in FIGS. 1–5 is a generally cylindrical brake cap 78 which is inserted into the hollow pole 28 at the upper end 40. The brake cap 78 includes a cylindrical cap member 80 which rests upon the rim at the pole end 40 and a main body portion 82 which is wedged into the hollow, cylindrical chamber of the pole 28 at the upper end 40 thereof. The brake cap 78 may be manufactured from plastic, rubber, or metal. As shown in the side elevational views of FIGS. 3 and 4, the brake cap 78 has a generally rectangular-shaped cut-out portion 84. Also, the brake cap 78 includes a downwardly-opening, cylindrical blind hole 86 which is in axial alignment with the brake rod 58 when the rod 58 is disposed within the pole 28. When the brake means is disengaged to permit the base member 14 to rotate, the rod end 60 slightly protrudes into the blind hole 86. Also, a vertically-extending channel or groove 88 is formed on an inner wall of the portion 84. The portion 84 extends completely through the diameter of the brake cap 78.

As illustrated in FIGS. 3–5, a load washer 90 is secured, preferably by welding, at the rod end 60. The washer 90 extends to and is contiguous with the inside diameter of the hollow cylindrical chamber of the pole 28, and the washer 90 moves upward or downward within the chamber of the pole 28 concomitant with the movement of the brake rod 58. Circumjacently disposed at the rod end 60 between the washer 90 and a lower flat cylindrical surface 92 of the brake cap 78 is an upper compression spring 94. When the turn stand 10 is fully assembled, the spring 94 is loaded for linear extension and compression which allows for proper brake member 64 engagement or disengagement with the base member 14. In addition, as illustrated in FIGS. 3–5, a lower compression spring 96 is circumjacently disposed on the brake rod 58 with an upper end 98 contiguous with the washer 90. The spring 96 is unloaded, for taking the play out of the handles 44 during brake engagement or disengagement.

As shown in FIGS. 3–5, the structural element which connects the rod 58 to the cap 78 is an elongated, U-shaped brake release rod 100. The rod 58 has a drilled through-hole located at the end 60 thereof, and a lower prong 102 of the rod 100 is inserted therethrough. The rod 100 also has an upper prong 104 which is inserted into the groove 88 for traveling a very short distance upward or downward therein during engagement or disengagement of the brake means.

Figure 6:
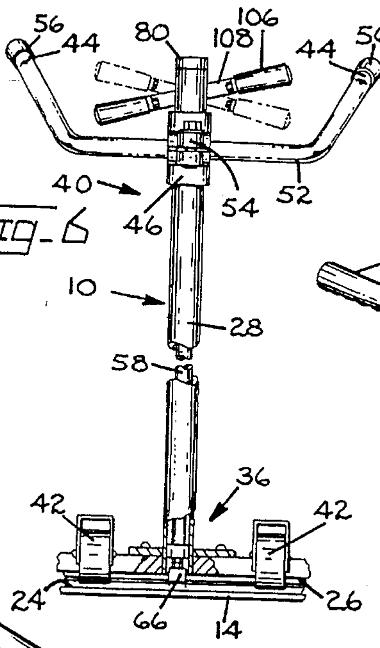
FIG. 6 is a front elevational view of the turn stand first shown in FIG. 1 illustrating the pivotal movement of the brake handles.
Figure 10:
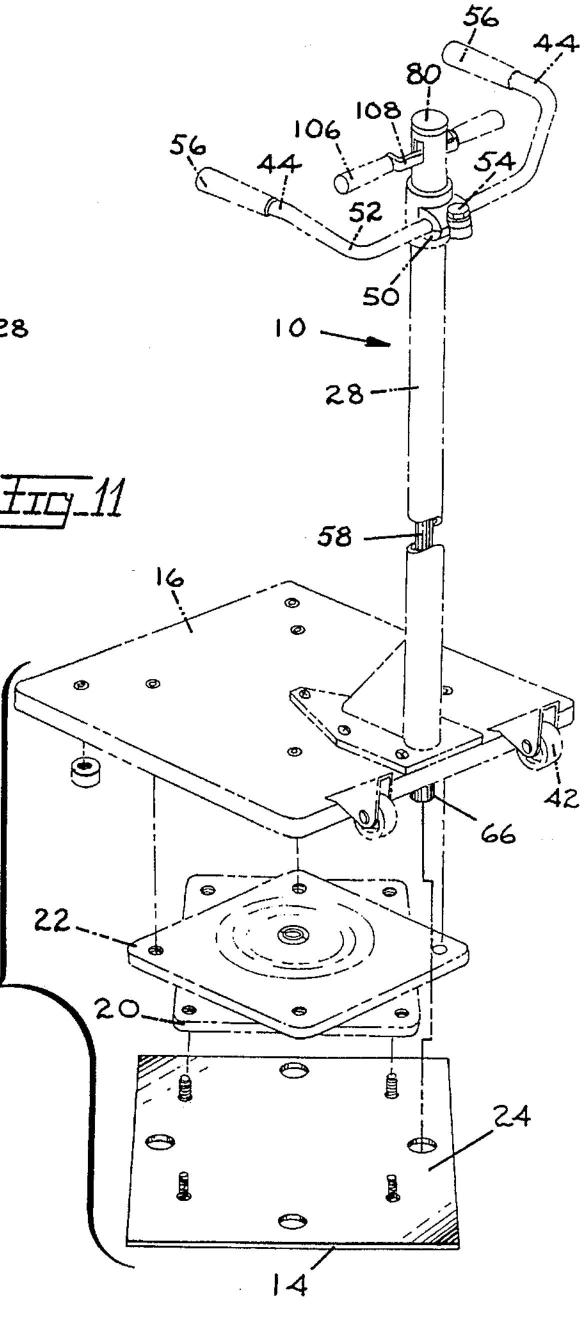
FIG. 10 is an exploded isometric view of the turn stand illustrating an alternative embodiment for the base member.

As illustrated in FIGS. 3–7, there is shown a pair of manually-operable brake handles 106, each of which is attached to a steel lever 108. The steel lever 108 is inserted through oppositely-disposed, thin, rectangular slots 110 at the pole end 40 as shown in FIGS. 1, 2, and 10. The steel lever 108 has a central bore hole 112 through which the prong 104 of the brake release rod 100 is inserted so that the prong 104 can ride in the groove 88 as shown in FIGS. 4 and 5. The brake handles 106 are manually pivotable as shown in FIGS. 5 and 6 by simply pushing down or pulling up on either handle 106. Essentially, the lowest horizontal surface which defines both slots 110 serves as a fulcrum upon which the bottom edge of the lever 103 pivots when the individual or the assisting individual pulls up or presses down on either of the handles 106. When either handle 106 is manually pivoted upward or downward as shown in FIGS. 5 or 6, the bottom edge of the lever 108 pivots upon the horizontal surface of either slot 110 and causes the upper prong 104 of the rod 100 to ride slightly upward in the groove 88. Because the rod 100 is attached to the rod 58 by the lower prong 102, the rod 58 is also slightly pulled upward and concomitant with this upward movement is the compression of the spring 94 against the lowest surface 92 of the brake cap 78. The blind hole 86 of the brake cap 78 is several inches long and as the rod 58 is pulled upward by pivoting either handle 106, the upper rod end 60 travels into the hole 86.

As illustrated in FIGS. 3–7, the upward movement of the rod 58 within the pole 28 causes the brake member 64 to lift off of the surface 24 of the base member 14 which thus allows the platform 16 to be pivoted or rotated relative to the stationary base member 14. The individual or the assisting individual must maintain an upward or downward force on either handle 106 during the rotation of the platform 16. When the platform 16 has been rotated so that the individual is in a position to be transferred, the individual or the assisting individual can then release the handle 106 which causes the spring 94 to return to its relaxed or normal state, and in so doing the spring 94 pushes downward against the washer 90 secured to the rod 58. This causes the upper prong 104 of the rod 100 to be pulled downward within the groove 88. Simultaneously with these actions, the rod 58 is pushed downward within the pole 28 so that the brake 66 firmly engages and contacts the upper surface 24 of the base member 14. As soon as the upper surface 24 is contacted by the brake 66, rotation of the platform 16 stops. The turn stand 10 of the present invention thus includes a simple and efficient brake means which is manually operable and which permits a 360° continuous rotation of the platform 16 for transferring the individual from one location to another.

Figure 8:
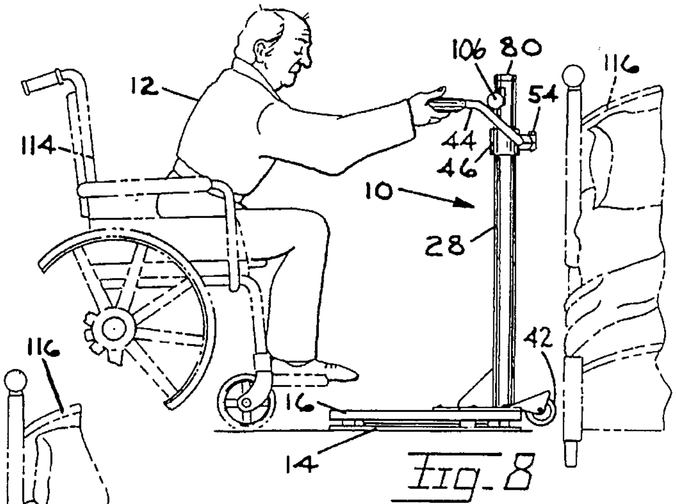
FIG. 8 is an elevational view of the turn stand disposed adjacent an individual requiring transference from a wheelchair to a bed.
Figure 9:
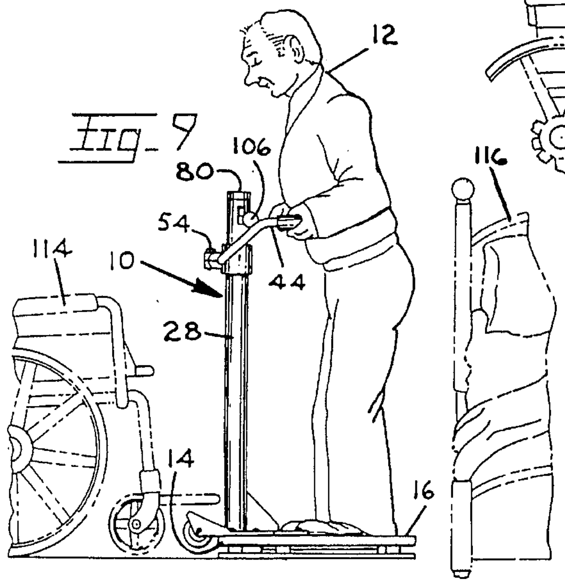
FIG. 9 is a side elevational view of the turn stand with the individual being supported thereon for transference to the bed.

As shown in FIGS. 8 and 9, it is a relatively simple process to employ the turn stand 10 to transfer the individual 12. First, the turn stand 10 should be positioned in front of the seated or prone individual 12 who requires assistance in moving from one location to another. In FIG. 8 the individual 12 is shown seated in a wheelchair 114 and the turn stand 10 is disposed between the wheelchair 114 and the bed 116 to which the individual 12 will be transferred. Although FIGS. 8 and 9 do not show an assisting individual it should be assumed that an assisting individual will always be present for safety reasons.

The assisting individual helps the individual 12 in placing his or her feet onto the middle of the platform 16 of the turn stand 10. The individual 12 is then helped to the standing position by the assisting person; at the same time the individual 12 is directed to firmly grip the handles 44 to maintain his or her balance and support himself or herself in the upright position. Then the assisting person manually pulls upward or pushes downward on either brake handle 106 which causes upward movement of the rod 58 in the pole 28 and compression of the spring 94 against the surface 92 of the brake cap 78. The upward movement of the rod 58 disengages the brake 66 from contact with the surface 24 of the base member 14 and, consequently, the platform 16 can now be slowly rotated with the individual 12 standing on the platform 16 and holding onto the handles 44. When the platform 16 is rotated so that the individual 12 is positioned adjacent the object to which he or she is to be transferred, such as the bed 116 in FIG. 9, the assisting person releases the brake handle 106 which immediately causes the spring 94 to relax and return to its normal state thereby pushing the rod 58 downward within the pole 28 and causing the brake 66 to immediately contact and engage the upper surface 24 of the base member 14. Rotation of the platform 16 is now halted. The assisting person then gently and slowly helps the individual 12 off of the platform 16 and onto the bed 116 as shown in FIG. 9. Once the individual 12 is transferred to the bed 116, as shown in FIG. 9, or to another object such as a wheelchair, liftchair, toilet seat, dining room chair, or any other piece of furniture, the assisting person can manually push up or down on either brake handle 106 and rotate the platform 16 180° so that the pole 28 and the wheels 42 are opposite of the bed 116 as illustrated in FIG. 9. Finally, the assisting person can firmly grip handles 44 and tilt the pole 28 toward himself until the wheels 42 contact the floor. The turn stand 10 can then be wheeled to a closet or hallway or some other location where it will be handy and readily available for its next use.

Illustrated in FIG. 10 is a slight variation on the brake means illustrated in the preferred embodiment of the turn stand shown in FIGS. 1–9. In FIG. 10, four equally distant spaced through-holes 118 are shown drilled through the base member 14 so that the brake member 64 will extend therethrough and contact the floor when the brake means is engaged. In this variation the platform 16 can only be rotated to four discrete positions due to the shape and configuration of the ball bearing structure 18 and the placement of the holes 118. However, in this variation the brake means actually engages the floor, therefore, a secure contact by the brake 66 against the floor is achieved. Nonetheless, the number of discrete positions to which the platform 16 can be rotated are reduced in this embodiment of the brake means.

Figure 11:
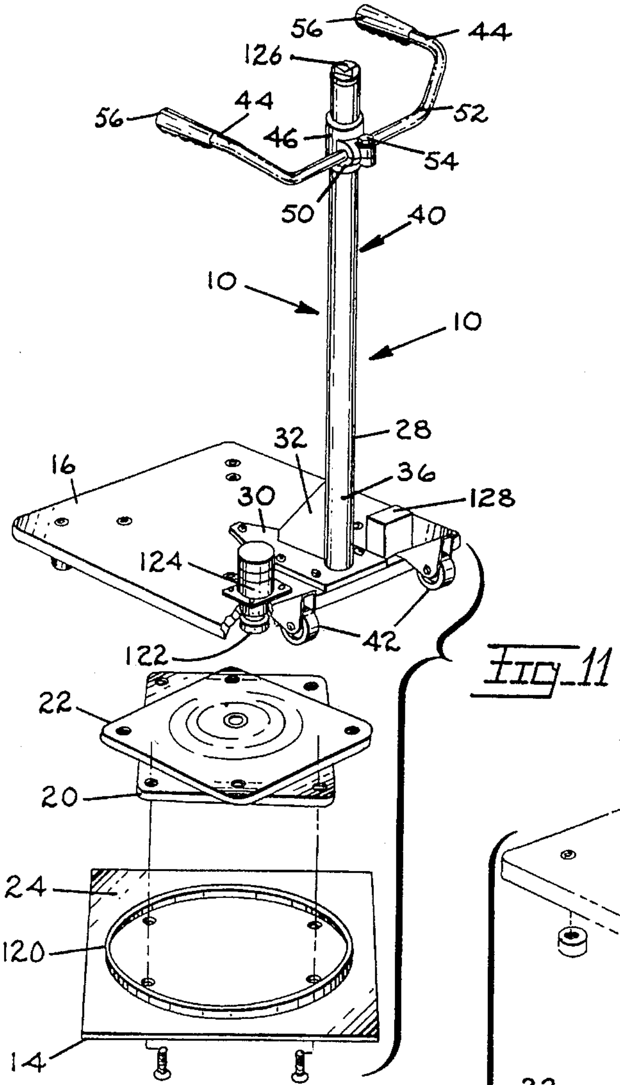
FIG. 11 is an exploded isometric view of the second alternative embodiment for the turn stand illustrating a motor, a drive wheel, and circular tracking wheel.
Figure 12:
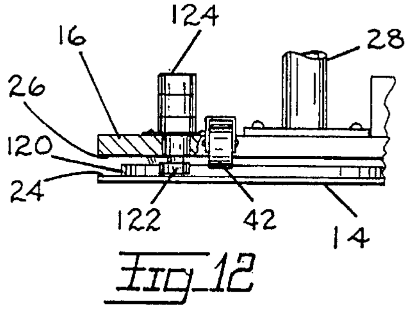
FIG. 12 is an enlarged fragmentary view of the turn stand first shown in FIG. 11 illustrating the engagement of the drive wheel to the circular tracking wheel.

Illustrated in FIGS. 11 and 12 is an alternative embodiment of the turn stand 10 wherein an automatic rotation means is utilized to initiate and cause rotation of the platform 16 relative to the stationary base member 14. As shown in FIGS. 11 and 12 the rotation means is disposed between the lower surface of the platform 26 and the upper surface 24 of the base member 14. The rotation means illustrated in FIGS. 11 and 12 includes a circular tracking wheel 120 which encircles the ball bearing swivel structure 18 illustrated in FIG. 2. The circular tracking wheel 120 will be mounted to the base member 14 and may be screwed or bolted to the base member 14. Utilized in connection to or in contact with the tracking wheel 120 is a drive means which is mounted to the platform and includes a structural member in contact with the tracking wheel 120. The drive means illustrated in FIGS. 11 and 12 includes a circular rubber drive wheel 122 driven by a reversible DC motor 124. The drive wheel 122 frictionally engages and contacts the tracking wheel 120 and when the motor 124 is activated by a drive switch 126 located at the pole end 40, rotation of the drive wheel 122 occurs. The drive switch 126 is a simple toggle-type switch which activates the DC motor 124. By pressing one portion of the switch 126, the platform 16 is rotated in a clockwise manner; by pressing the other portion of the switch 126 down, the platform 16 is rotated in a counterclockwise manner. The rotational frictional movement of the drive wheel 122 against the tracking wheel 120 causes the drive wheel 122 to slowly walk or move around the tracking wheel 120, and this causes the platform 16 to rotate in a clockwise or counterclockwise direction as desired. The ease or difficulty with which the platform 16 rotates can be adjusted by varying the force or pressure with which the drive wheel 122 engages and contacts the tracking wheel 120. In addition, a charger and battery pack 128 can be mounted to the platform 16 for permitting easy recharging of the motor 124.

Figure 13:
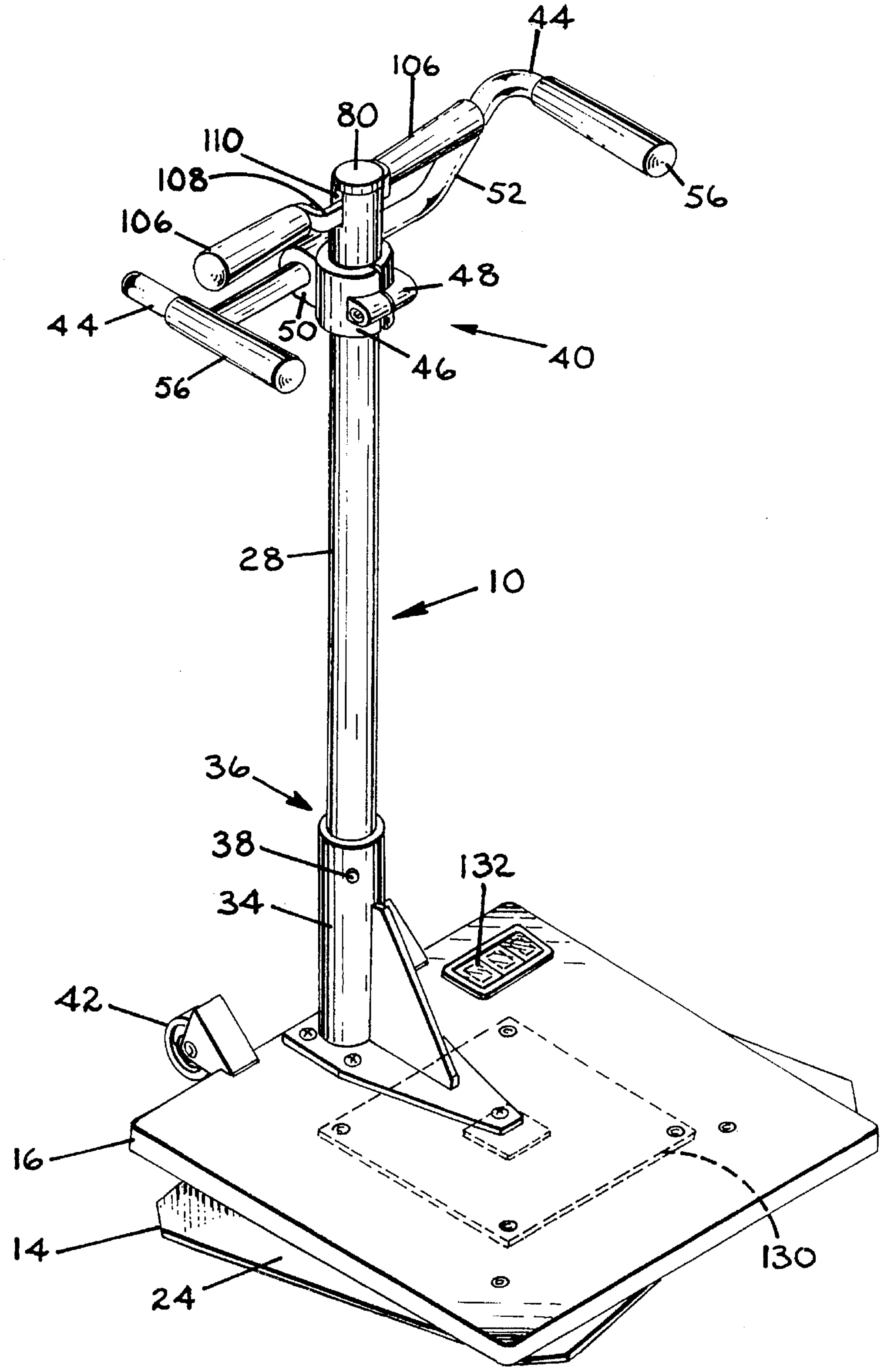
FIG. 13 is a third alternative embodiment of the turn stand illustrating a load cell disposed between the platform and the base member.

Illustrated in FIG. 13 is a second alternate embodiment of the turn stand 10. In this embodiment a load cell 130 has been attached subjacent to the platform 16 for registering the weight of the individual while standing on the platform 16. Load cells are manufactured by a number of companies; one type of load cell applicable for this use is the Entran Devices, Inc. ELF-500/13 Series ultra-miniature load cells. These load cells are miniaturized load measurement devices which employ semiconductor technology and micro-miniaturized design techniques to give the user unlimited force measurement flexibility. Because of the thinness of Entran's ELF load cells (the ELF-500/13 series load cells are 0.110 inches (2.8 mm) thick), they can be disposed subjacent to the platform 16 while, at the same time, the turn stand 10 can still accommodate the ball bearing swivel structure 18 as previously described and shown in FIG. 2. In addition, the turn stand 10 shown in FIG. 13 will include a means to provide a numerical representation of the weight of the individual determined by the load cell 130 when the individual is standing upon the platform 16. This numerical representation means will be visably observable to the individual standing on the platform and may be in the form of a LED display 132 electrically connected to the load cell 130. Because the load cell 130 is contained within and secured to the platform 16, the load cell 130 and the numerical representation means will rotate concomitant with the rotation of the platform 16.

The foregoing is a description of a preferred embodiment of the invention and several alternative embodiments of the turn stand of the present invention. The present invention, in both its preferred embodiment and in its alternative embodiments, is not to be taken as limited to any of the specific features as described, but comprehends all such variations thereof as come within the scope of the appended claims.

We claim:

1. A turn stand for moving an individual from one location to another across a floor, comprising:

- a flat base member for disposition on the floor and which is capable of movement thereon;
- a platform secured superjacent to the base member and upon which the individual stands;
- rotation means disposed between and connecting the base member to the platform for permitting selective rotation of the platform with respect to the base member while the base member remains stationary;
- an upright pole removably securable to the platform at a lower pole end and terminating at an upper pole end;
- a pair of handles attached to the upper pole end which can be gripped by the individual for supporting the individual in a generally upright position; and
- manually operable brake means disposed within the pole and capable of selectively engaging the flat base member to halt the rotational movement of the platform with respect thereto or to selectively disengage from the base member to allow rotational movement of the platform with respect to the base member.

2. The turn stand of claim 1 further comprising a pair of spaced-apart wheels mounted to the platform for facilitating movement of the turn stand on the floor.

3. The turn stand of claim 1 wherein the rotation means includes a ball bearing assembly disposed between and secured to both the base member and the platform member for permitting selective rotational movement of the platform relative to the base member when the brake means is disengaged.

4. The turn stand of claim 1 further comprising a cylindrical sleeve mounted to the platform and projecting upwardly therefrom.

5. The turn stand of claim 4 wherein the upright pole is capable of insertion into the sleeve and selective removal therefrom.

6. The turn stand of claim 1 further comprising a handle adjustment means for varying the position of the handles on the pole in order to accommodate individuals of different heights.

7. The turn stand of claim 6 wherein the handle adjustment means includes a mounting collar capable of selective slidable reciprocable movement on the upright pole.

8. The turn stand of claim 1 wherein the pair of handles are attached to the mounting collar so that the handles move with the mounting collar when the mounting collar is selectively adjusted on the upright pole.

9. The turn stand of claim 1 wherein the brake means includes an elongated brake rod having an upper rod end and a lower rod end which is disposed within and extends the length of the pole and is capable of selective linear reciprocable movement within the pole.

10. The turn stand of claim 9 wherein the brake means includes a brake member mounted at the lower rod end of the brake rod and which contacts the base member when the brake means is engaged and is lifted off the base member when the brake means is disengaged.

11. The turn stand of claim 10 wherein the brake member includes a rubber brake which contacts and resistably engages the base member when the brake means is engaged and which is lifted off the base member when the brake means is disengaged.

12. The turn stand of claim 11 further comprising a cylindrical brake cap inserted into the pole at the upper pole end for limiting the upward linear movement of the brake rod within the pole.

13. The turn stand of claim 12 wherein the brake means includes a pair of brake handles pivotally secured to the brake cap for selective manual pivotal movement upward away from the platform and downward toward the platform so that the brake member can be lifted off the base member.

14. The turn stand of claim 13 wherein the brake means includes a brake release rod disposed within the pole at the upper pole end and having a first rod end attached to the brake cap and a second rod end attached to the upper rod end of the brake rod.

15. The turn stand of claim 14 wherein the brake means includes a load washer circumjacently attached to the brake rod adjacent the upper rod end.

16. The turn stand of claim 15 wherein the brake means includes an upper tension spring circumjacently disposed on the brake rod adjacent the upper rod end between the load washer and the brake cap.

17. The turn stand of claim 16 wherein manually pushing up or down on either brake handle pulls the brake release rod and the brake rod upwards away from the platform compressing the upper tension spring between the brake cap and the load washer whereby the brake member is lifted off and disengaged from the base member so the platform can be rotated.

18. The turn stand of claim 17 wherein the brake means includes a lower tension spring circumjacently disposed on the brake rod adjacent the upper rod end between the load washer and the second rod end of the brake release rod.

19. A turn stand for moving an individual from one location to another across a floor, comprising:

- a flat base member for disposition on the floor and which is capable of movement thereon;
- a platform secured superjacent to the base member and upon which the individual stands;

rotation means disposed between and connecting the base member to the platform for permitting selective rotation of the platform with respect to the base member while the base member remains stationary;

an upright pole removably securable to the platform at a lower pole end and terminating at an upper pole end;

a pair of handles attached to the upper pole end which can be gripped by the individual for supporting the individual in a generally upright position; and a drive means for selectively rotating the platform with respect to the base member.

20. The turn stand of claim 19 wherein the drive means includes a circular tracking wheel mounted to the base and disposed between the base and the platform.

21. The turn stand of claim 20 wherein the drive means includes a drive wheel for frictionally contacting the tracking wheel and which is selectively actuated for rotational frictional motion against the tracking wheel whereby the drive wheel moves along the circular tracking wheel thus causing the platform to rotate.

22. A turn stand for moving an individual from one location to another across a floor, comprising:

a flat base member for disposition on the floor and which is capable of movement thereon;

a platform secured superjacent to the base member and upon which the individual stands;

rotation means disposed between and connecting the base member to the platform for permitting selective rotation of the platform with respect to the base member while the base member remains stationary;

an upright pole removably securable to the platform at a lower pole end and terminating at an upper pole end;

a pair of handles attached to the upper pole end which can be gripped by the individual for supporting the individual in a generally upright position;

manually operable brake means disposed within the pole for selectively engaging the flat base member to halt the rotational movement of the platform with respect to the base member and for selectively disengaging from the base member to allow rotational movement of the platform with respect to the base member;

a load cell disposed subjacent to the platform and secured thereto, the load cell capable of registering the weight of an individual standing on the platform; and means to provide a numerical representation of the weight of the individual determined by the load cell which can be visibly observed by the individual.

23. The turn stand of claim 22 wherein the load cell is contained within and rotates concomitant with the platform.

* * * * *